United States Patent [19] [11] 3,708,633

Nye et al. [45] Jan. 2, 1973

[54] UNIDIRECTIONAL TAPE MOTION DETECTION APPARATUS AND AUTOMATIC TAPE RETURN

[75] Inventors: William M. Nye, Bellevue; Stanley W. Jones, Seattle, both of Wash.

[73] Assignee: Lanier Electronic Laboratory, Inc. Atlanta, Ga.

[22] Filed: Sept. 26, 1969

[21] Appl. No.: 861,242

[52] U.S. Cl. .....179/100.2 R, 179/100.1 DR, 226/49
[51] Int. Cl....G11b 15/10, G11b 15/20, G11b 27/20
[58] Field of Search...179/100.2 A, 100.2 MD, 100.1 DR, 179/100.2 S, 100.2 R; 226/49, 50, 51

[56] References Cited

UNITED STATES PATENTS 2,757,456 8/1956 Handa ..........................179/100.2 R
3,288,941 11/1966 Langendorf et al.........179/100.1 DR
3,467,790 9/1969 Bolick........................179/100.1 DR
3,467,791 9/1969 Bolick........................179/100.1 DR

*Primary Examiner*—Bernard Konick
*Assistant Examiner*—Alfred H. Eddleman
*Attorney*—Jones & Thomas

[57] ABSTRACT

In dictation systems in which magnetic tape is stored in bins, unidirectional tape motion switches and related control and monitor circuits are provided to automatically return previously reversed but unlistened tape to the place where the dictation was terminated. Also provided are unidirectional switches and circuitry to determine the accumulative length of tape transcribed and/or dictated and awaiting transcription.

9 Claims, 10 Drawing Figures

INVENTORS
WILLIAM M. NYE
STANLEY W. JONES
BY Seed, Berry & Dowrey
ATTORNEYS

INVENTORS
WILLIAM M. NYE
STANLEY W. JONES
BY
Seed, Berry & Dowrey
ATTORNEYS

INVENTORS
WILLIAM M. NYE
STANLEY W. JONES
BY
Reed, Berry & Downey
ATTORNEYS

INVENTORS
WILLIAM M. NYE
STANLEY W. JONES
BY
Seed, Berry & Dowrey
ATTORNEYS

UNIDIRECTIONAL TAPE MOTION DETECTION APPARATUS AND AUTOMATIC TAPE RETURN

BACKGROUND OF INVENTION

As indicated in U.S. Pat. Nos. 2,988,604, 3,024,320, and 3,209,974, in a recording and reproducing system, particularly, one for dictating and transcribing, magnetic tape is stored in adjacent upright bins and preferably made endless for its continuous transport through first the recording operations and then the reproducing and/or transcribing operations. During such transport oftentimes both the person dictating and the person transcribing desire to know the inventory status of the tape. In keeping such inventory it is necessary to compensate for reversal of the tape due to playback for listening. In addition, if only a portion of the reversed tape is listened it is desirable, upon securing the handset to its cradle or otherwise stopping the listening, to return the entire length of reversed tape to the place where the dictation had terminated. Thereafter, continued dictation will not be delayed nor will a run of tape receive the confusing signals of a double recording.

SUMMARY OF THE INVENTION

Unidirectional means are provided to detect the motion of recording tape in the reversal mode preparatory to correction or listening of dictation and to accumulate the motion of the tape only in the desired mode. Such accumulation thereby giving an accurate reading of the amount of tape placed in the desired mode. In the preferred form the unidirectional means comprises a unidirectional switch and circuit components responsive to the condition of said switch to accumulate the motion of the tape in the desired mode.

In one form of the invention the amount of tape in the prescribed mode constitutes completed transcription such that the accumulation indicates only the amount of tape actually transcribed and ignores the amount of tape relistened to during tape reversals by the transcriber.

In another form of the invention unidirectional means detect the amount of tape dictated in the desired mode, the amount of tape transcribed in the desired mode and accumulates only the net difference between the two to indicate the amount of tape dictated but awaiting transcription. In the preferred form the net difference between the dictation and transcription in the desired modes is detected by a single differential meter.

In still another form of the invention the accumulated transcription in the desired mode and the net difference between the dictation and transcription in the desired modes is simultaneously indicated.

Another feature of the invention is the provision of means for detecting motion of tape in the reversal mode preparatory to correction or listening to dictation and to automatically return the reversed but unlistened tape to the place where the dictation was terminated. In the preferred form the unidirectional means includes an inexpensive solid state switching and latching circuit for automatically energizing the tape motive means to return the tape to the place where the dictation terminated.

In the preferred form of the invention the unidirectional means includes a switch having a control arm through which the tape is passed and which is maintained in a position to indicate motion of the tape in the desired mode by friction between the tape and the control arm.

DRAWINGS OF PREFERRED EMBODIMENTS

Figure 2:
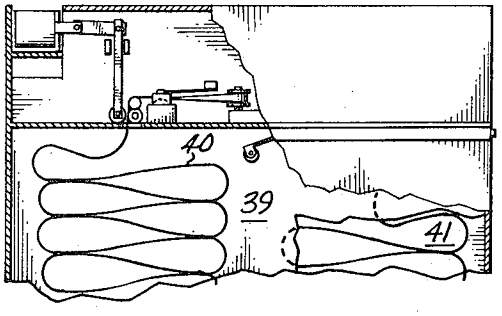
FIG. 2 is a partial front elevation, with parts broken away, to illustrate some components of a recording and reproducing apparatus utilizing free folding ribbon-like magnetic tape stored in bins and also incorporating a unidirectional tape motion switch.
Figure 5:
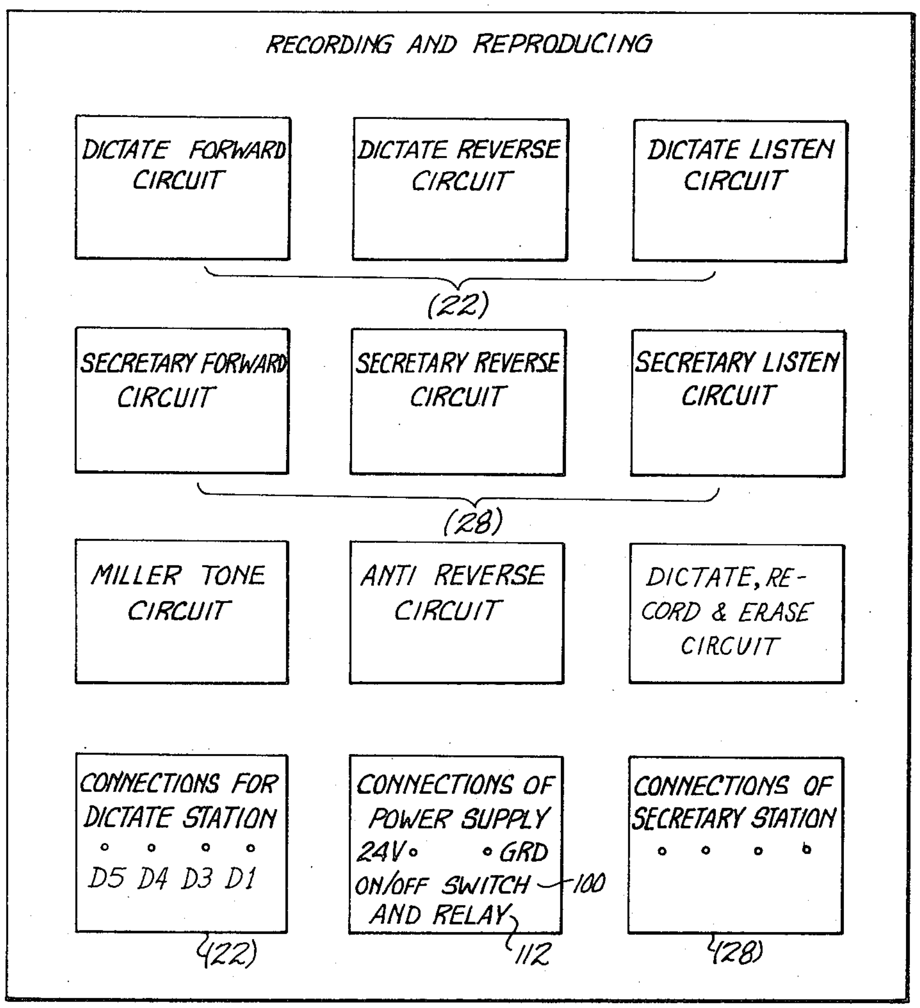
Figure 6:
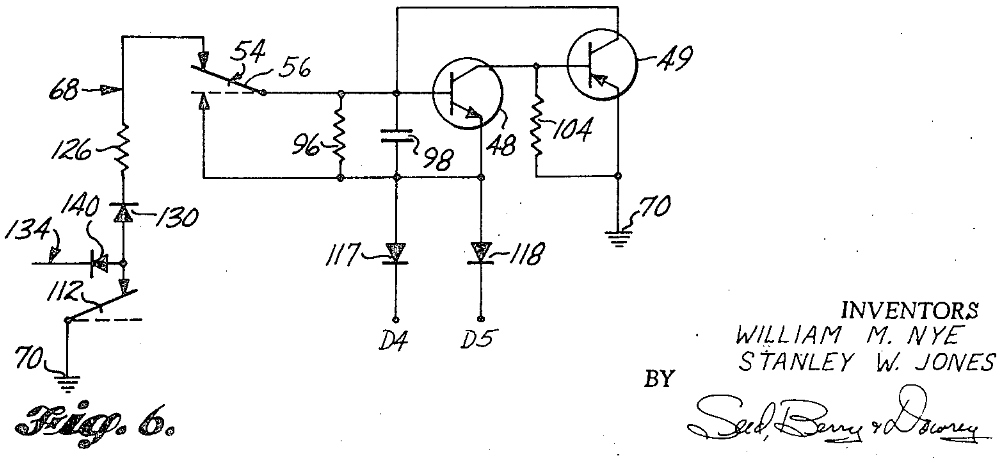
Figure 7:
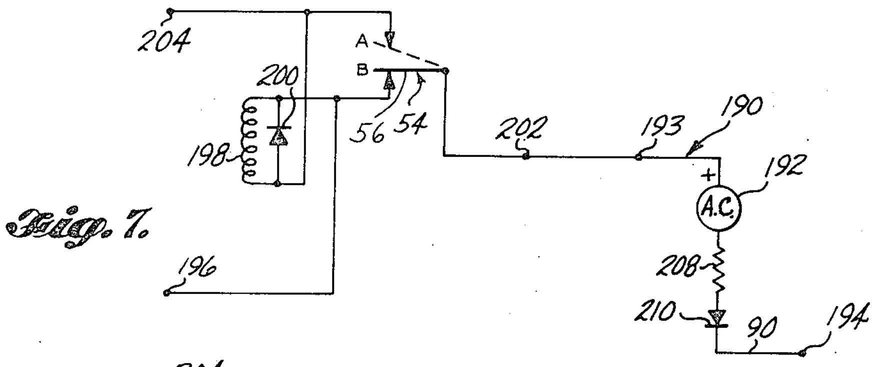
Figures 8, 9:
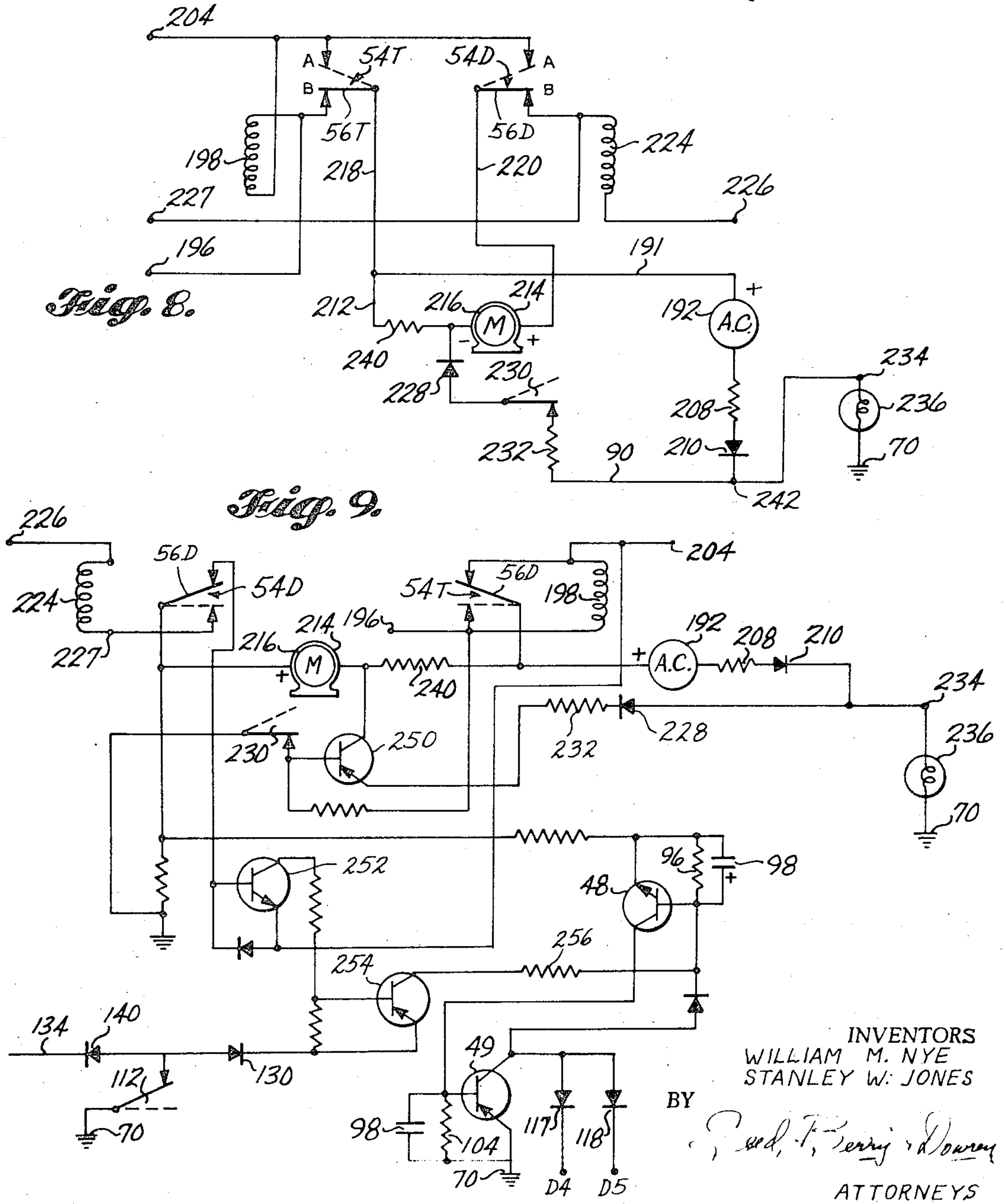
Figure 10:
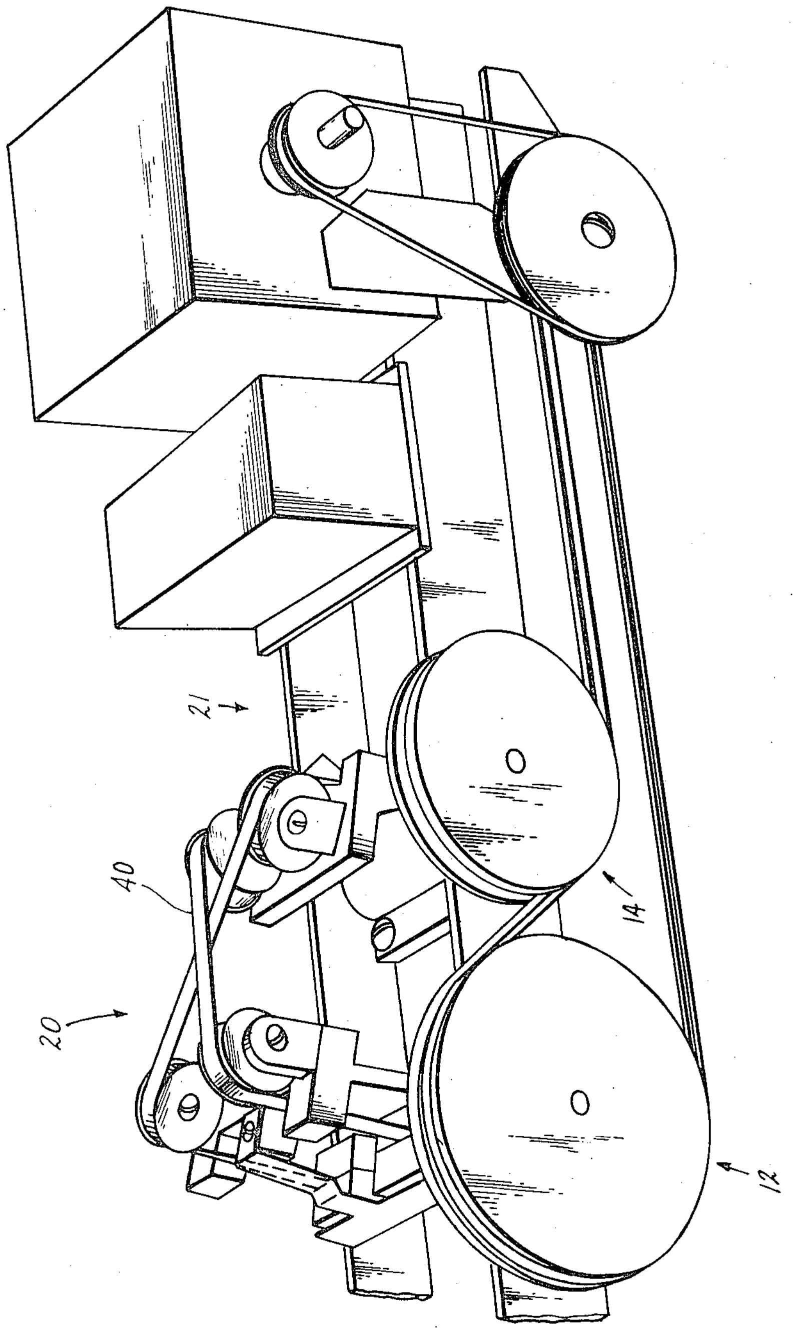

FIG. 5 is a schematic view on block diagrams of the functional electrical components located principally within the main housing, inclusive of tape bins, of the recording and reproducing apparatus wherein magnetic tape is handled as indicated in FIG. 2, indicating the relative location of specific electro-mechanical and electrical components that are again illustrated subsequently in various circuit embodiments;

FIG. 6 is a circuit embodiment which incorporates the unidirectional tape motion switch to insure that the circuit will be functional in automatically returning all reversed tapes even though complete listening by the dictator may not have occurred;

FIG. 7 is a circuit embodiment which incorporates the unidirectional tape motion switch to activate a circuit in which an accumulative counter operates to indicate, for example, how much transcribing has been done;

FIG. 8 is an overall circuit embodiment which incorporates unidirectional tape motion switches to activate circuits in which both a message, differential or backlog meter, and an accumulative counter or production totalizer are included;

FIG. 9 is an overall circuit embodiment which incorporates unidirectional tape motion switches to activate circuits in which both a backlog meter and a production totalizer of FIG. 7 are included in conjunction with the automatic listen reset of FIG. 5; and FIG. 10 is a schematic isometric of a typical recording and reproducing apparatus.

DESCRIPTION OF PREFERRED EMBODIMENTS

An Overall System

Figure 1:
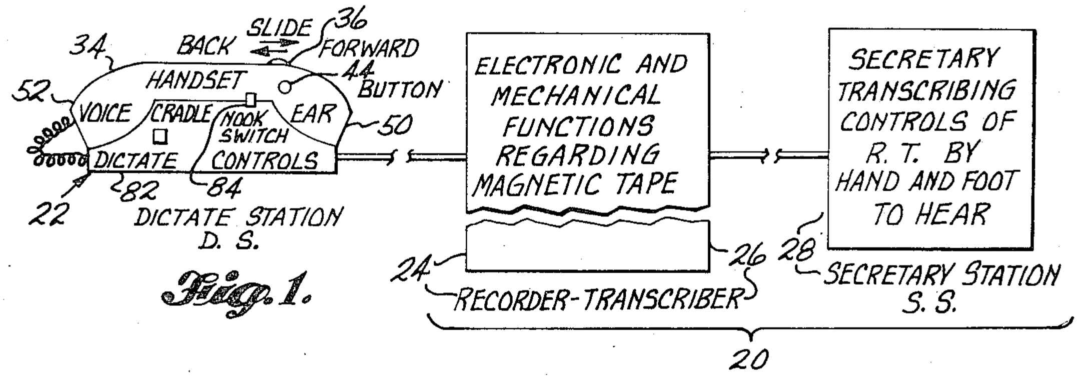
FIG. 1 is a schematic view of an overall recording and reproducing apparatus to indicate an environment in which various embodiments of the invention are applicable.

An overall basic assembly of a recording and reproducing apparatus 20 is illustrated schematically in FIGS. 1 and 10, in particular reference to fulfilling dictating and transcribing requirements. This basic assembly is oftentimes enlarged to include multiple dictation and/or transcription stations. Throughout all such apparatus magnetic tape 40 is handled preferably in one principal housing 21 wherein the recorder 24 and reproducer 26 are installed. In general, the apparatus 20 includes means 12 for moving tape in a first direction and means 14 for moving tape in a second direction. Magnetic tape bin storage compartments 39, 41 are utilized within housing 21 to receive and to discharge magnetic tape 40. During the transport of tape 40, its temporary storage, as necessary, is undertaken by moving tape 40 into bin compartments 39, 41 where it rests loop upon loop, as illustrated in FIG. 2 and as also shown in U.S. Pat. Nos. 2,988,604, 3,024,320, 3,209,974, and 3,347,432.

Unidirectional Tape Motion Switch

Figures 3, 4:
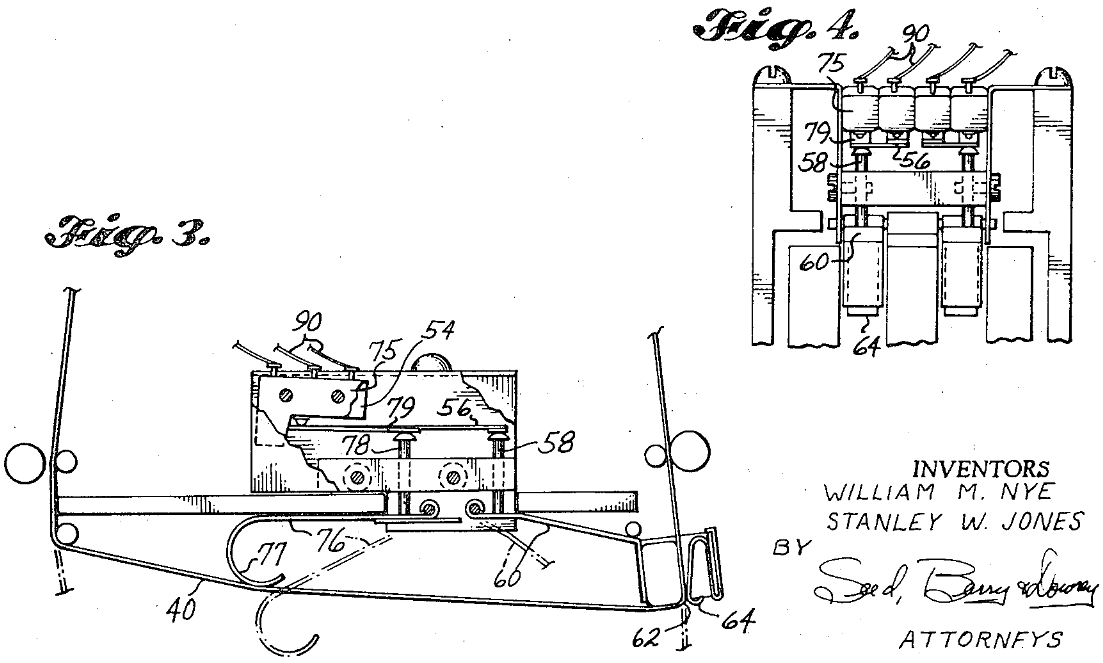
FIG. 3 is a partial enlarged front view of the unidirectional switch shown in FIG. 2 indicating the position of the switch during normal dictation or transcription in solid lines and in the playback or reversed mode in dotted lines.
FIG. 4 is a partial enlarged side view of the unidirectional switch shown in FIGS 2 and 3.

As shown in FIGS. 2 and 3, at the top of the respective bin 39, a tape limit or bin switch 75 is mounted. It is operated upon pivotal movement of a lever arm 76. The latter is tilted upwardly when tape 40 is almost drawn tightly across bin 39. Before reaching this possible breaking situation, tape 40 bears against curved end 77 of arm 76 tilting it up into engagement with plunger 78. In turn plunger 78 moves contact 79 of switch 75. This limit switch placement is also shown in U.S. Pat. No. 2,988,604.

Preferably, the unidirectional tape motion switch is also located at the top of a respective bin 39, or 41 in a similar arrangement. Also it includes an off and on switch 54 by having a switch arm 56 which is moved by a plunger 58. The plunger 58, in turn, is moved upon pivoting of a control or lever arm 60. However, instead of having a curved end 77, control arm 60 has a slotted end 62 equipped with smooth surfaced cams 64, 66 which guide magnetic tape 40 being transported through slot 62 and upwardly out of the bin 39. When so transported out of bin 39 as shown by solid lines in FIG. 3, the control arm is raised placing switch 56 in position B in FIG. 6. However, when tape 40 is returned to bin 39, for example, by reversing preparatory to listening or correcting by a dictator, control arm 60 pivots downwardly as shown in phantom lines, placing switch arm 56 in position A in FIG. 6, and the returning tape falls into various loop levels until the reversing of tape 40 ceases. Then as tape 40 is advanced again, reversed loops are retrieved first before lever arm 60 is again pivoted upwardly to return the switch arm 56 to position B.

A unidirectional switch 54 is also mounted in bin 41, conveniently with a limit switch 75. As so mounted, they control and monitor magnetic tape motion by controlling energy in various circuits connecting with others and other components of the overall recording and reproducing system. The various embodiments of these control and monitoring circuits are interrelated to an overall system as explained in conjunction with principal components and circuits shown schematically in the block diagram of FIG. 5, indicating the contents within the housing 21 of the recorder 24 and reproducer 26.

Tape Reversal With Automatic Return

One important use of the unidirectional tape motion switch and a related circuit is to insure, following any listening sequence, that all tape reversed for listening, if listened to only in part, will be completely returned to the place where the dictation terminates before dictation is undertaken once again by the dictator or by another dictate station . For example, a person dictating may reverse a long length of tape, listen only to a short length, and hang up at the close of a business day or at some other time. The circuit shown in FIG. 6 utilizes the unidirectional tape motion switch 54 to insure this circuit's operation which assists in the return of the remaining unlistened tape. It is referred to as the dictate listen reset circuit 68.

As shown in FIG. 6, the switch arm 56 of unidirectional switch 54 is in position A during the reset operation, having moved to this position during the tape reversal of the partially listened tape 40. It will remain there until all reversed tape loops are transported back. Then the tape 40 sliding through sleeve 63 of slotted end 62 of control arm 60 will be raised to place the switch arm 56 to position B in FIG. 6.

This listen reset latching circuit 68 has a pair of transistors, one preferably referred to as a sensing transistor 48 and the other preferably referred to as a latching transistor 49. In the remaining circuit of wires or conductors 90, other components are added to perfect and maintain this latching together of these transistors 48, 49 until all tape reversed for listening is returned so dictation may again be undertaken without delay and without hindrance to earlier dictation.

In analyzing this circuit 68, and in reference to all diodes, it must be remembered this circuit is interconnected to overall system circuits which in turn must be considered as being supplied with a power source of negative voltage, generally minus 24 volts. The potential however can be positive, thereby merely necessitating reversal of the components and transistor types as is well known in the art.

When the basic power supply 78 indicated in FIG. 5 is turned on, relay switch 112 is closed as shown in FIG. 6 creating a path to ground. During operation of dictate station 22 by a dictator he holds handset 34 off cradle 82. This moves the switch 112 to the position shown in dotted lines. To prepare for listening to his dictation he first reverses tape 40 by moving back slide 36 on handset 34. Then slide 36 is moved forward to listen. At this time during audio play back terminal W is at a reasonably high negative voltage potential and terminal R remains at its normal reasonably low negative voltage potential.

With the switch arm of relay switch 112 in the dotted position current cannot flow through diode 130, thereby preventing the turn-on of transistor 48. The circuit cannot therefore interfere with the control and audio leads D4, D5.

If the dictator should stop his listening and hang up before completing return of all reversed tape, the switch arm of relay switch 112 moves to the solid line position shown in FIG. 6. Since D4 and D5 are negative with respect to ground 70, bias current flows through diodes 117 and 118, from emitter to base on transistor 48, through the switch arm 56 of switch 54, through resistor 126 and diode 130. This turns on transistor 48, which in turn turns on transistor 49, latching both transistors on, and connecting D4 and D5 to ground 70 through diodes 117, 118. This ground on D4 and D5 puts the recorder into listen mode. Therefore, switch arm 56 of switch 54 remains in position A keeping the resetting of the tape underway. Such return of tape reversed for partial listening continues until the tape loops are exhausted. Then control arm 60 is raised again by the moving tape and switch arm 56 is moved to position B as indicated in dotted lines in FIG. 6. With switch arm 56 in position B, a conductor path is completed directly between the base and emitter of sensing transistor 48 placing them at the same potential in effect shortening out transistor 48. This disrupts the operation of latching transistor 49 and the ground connection is lost. So the reset is fully accomplished, yet when accomplished it is effectively stopped. Therefore, upon return of a dictator the recorder is ready to immediately receive his forthcoming dictation.

In regard to the other components of circuit 68, resistors, 96 and 104, each serve in temperature compensating the operation of respective transistors 48 and 49. Capacitor 98 serves a delaying function in the switching effects of these transistors which reduces the generation of noise.

Dictate-listen-reset circuit 68 in taking over the return function is able to do so because it continues to complete the regular listen-return circuits (not shown) of the overall recording and reproducing circuits. The connecting points to the overall circuits are at the relay switch 112, unidirectional tape motion switch 54, at diode 140 leading to antireverse circuit 134, and at D4 and D5.

ACCUMULATIVE COUNTING

Another important use of an electro-mechanical unidirectional tape motion switch 54 and a related circuit 190 concerns the counting or measuring in lineal lengths, and/or time: how much dictation reproduction or transcription has been completed. In FIG. 7, a circuit 190 is shown which actuates an accumulative counter 192 to indicate the reproduction or transcription that has been done. Such actuation is controlled by unidirectional switch 54, so only tape 40 advanced originally for transcribing the first time will be counted. Tape 40 reversed for relistening will not be counted.

Switch 54 is illustrated in FIGS. 2, 3 and 4 in its location at the top of a bin 41 or 39. In FIG. 7, the switch arm 56 of switch 54 is illustrated in solid lines at position B (control arm 60 is raised) in the accumulator circuit 190 when accumulator counter 192 is operating. Counter 192 may indicate passage of lineal lengths of magnetic tape 40 and/or the time period of such passage, depending on the type of counter installed.

The accumulator counter 192 is connected in a series of conductors 90, running between terminals 193 and 194 in the secretary station 28 and beyond through reproducer 26, not shown, except for its secretary terminal 202 and its power supply terminal 204 and back to terminal 196 of a foot pedal switch, not shown. Upon depression of a foot pedal, not shown, in the overall recording and reproducing system 20 indicated in FIG. 5, secretarial station 28 operates, causing a tape transport mechanism, not shown to advance magnetic tape 40 for listening. Such advance occurs as secretarial forward solenoid 198 is energized actuating a forward relay switch, not shown. To advance the tape a ground is applied to terminal 196 by the foot switch. Diode 200 is for circuit protection and noise elimination. Terminal 194 has a negative power supply voltage on it if the control arm 76 of bin switch 75 is lowered.

When tape 40 is advanced initially and listening occurs during the first attempt of transcribing, the presence of a slight resistance as tape 40 advances through sleeve or slot 62, assures that control arm 60 will be raised, moving plunger 58 into switch arm 56 of unidirectinal switch 54. Such resulting position of switch 54 is shown in FIG. 7 in a solid line at position B. When so positioned, the overall circuit is completed energizing accumulative counter 192.

When tape 40 is reversed by a secretary for relistening before final transcription is completed, the falling tape allows control arm 60 to lower moving switch arm 56 into position A in FIG. 7. In this position both sides of the accumulative counter circuit 190 are connected to the negative power supply terminal resulting in no current flow through the counter 192. Resistor 208 serves as a control resistor to adjust the speed/time of the accumulative counter. Diode 210 assures only intended current in proper direction will actuate counter 192.

Not until all tape 40 that has been previously reversed in preparation for and during relistening has been returned, does control arm 60 again respond to tape movement to swing upward resulting in switch arm 56 moving to position B and unidirectional switch 54 again being effective in closing the circuit through accumulative counter 192. By such operation, only tape 40 advanced for transcription is so indicated by reading the accumulative counter 192. Such a circuit combined with a unidirectional switch is used throughout an overall system wherever accumulative readings are wanted.

DICTATING AWAITING TRANSCRIBING

In FIG. 7, accumulative counter indicated how much transcription had been undertaken. In addition, or solely, oftentimes there is a need for knowing how much dictation awaits transcription. In FIG. 8, circuit 212, includes a motor 214 driven in either direction to control a differential message meter 216 that presents information regarding dictation awaiting transcription. Also optionally included is an accumulative counter 192, its resistor 208, diode 210 and portions of its circuit 192, as previously shown in FIG. 7. There are other components common to both circuit 192 and circuit 212. Unidirectional switch 54 of circuit 192 appears again and serves dual purposes of actuating both accumulative counter 192 and motor 214 of message meter 216 through utilization of circuit branch 218. In addition another unidirectional switch 54 is utilized to actuate motor 214 of message meter 214 in the opposite direction, through utilization of circuit branch 220. One switch 54D is controlled by the dictator's tape and the other switch 54T is controlled by the transcriber's tape.

When a dictator is working, and tape 40 recording such dictation is advancing, as dictation forward solenoid 224 connected between terminals 226 and 227 is energized by a ground on terminal 227, associated unidirectional switch 54D is moved into position B indicated by solid lines in FIG. 8. Such movement of tape 40, again causing arm 60 to pivot upwardly, as shown in solid lines in FIGS. 3 and 4. Switch arm 54D is in position B and circuit 220 therefore becomes effective by ground at 226. This is because the negative (−) side of motor 214 is connected through resistor 240, circuit 218, switch arm 56T of switch 54T, transcribe forward solenoid 198 to negative power supply at 204. This causes the meter 216 to move upward, i.e., indicate a larger amount of dictated by untranscribed tape. If the dictator reverses to listen, control arm 60 of switch 54D drops, the switch arm 56D moves to position A, shown in dotted lines, thereby removing the ground from circuit 220, and thus stopping motor 214. Motor 214 will again be energized when tape control arm 60 is again raised, moving switch arm 56D to position B. Motor 214 runs only if switch arm 56D is in position B and solenoid 224 is engaged by a ground on point 227.

The sequence for tape motion on the transcribe side is similar. The engagement of the transcribe forward solenoid 198 by a ground on terminal 196 results in that ground being applied through switch arm 56T in position B (assuming new tape is being transcribed and control arm 60 of switch 54T is raised), through circuit 218 to resistor 240 and motor 214. The positive (+) side of the motor is connected to negative potential at point 226 through switch arm 56D and dictate forward solenoid 224. (Terminal 226 is at negative potential at all times when all available tape has dictation on it. This is a safety feature inherent in recorder-transcriber 21.) The polarity across motor 214 is opposite to what it was when the dictator was pulling tape and therefore motor 214 runs in the reverse direction, moving meter 216 to a lower amount of dictated but untranscribed tape.

If both the dictator and transcriber are moving the tape and both control arms 60 of switches 54D and 54T are up then a ground is applied to both sides of motor 214 and it does not run. When neither dictator nor transcriber are moving tape, or when both control arms of switches 54D and 54T are down, the negative potential is applied to both sides of motor 214 and it does not run.

The motor and therefore the meter 216 will move in any direction only if one of the two persons is moving fresh tape, i.e., the respective control arm 60 is up and the respective switch arm 56T or 56D is at position B, and the other person is either not moving tape or has his control arm 60 in the downward position and therefore his respective switch arm 56T or 56D in position A. When either control arm is down, and therefore the respective switch arm 56T or 56D is in position A, negative potential is applied to that respective side of the motor 214. This insures that the other party will have control of motor 214 even if the previous party has reversed the tape motion, lowering his control arm 60.

The circuit 212 has an additional feature to provide for automatic correction for errors built up by the meter 216. This is comprised of Diode 228, switch 230, and Resistor 232. It operates as follows: When meter 216 is not at "Zero" position, switch 230 is in position shown by solid line. If it is at the "Zero" position switch 230 is in dotted position. When all tape has been transcribed by transcriber, the negative power that was fed to point 234 to keep light 236 "on," is turned off. If meter 216 is not at "Zero" at this time, switch 230 is in solid position, and a ground 70 is fed through light 236, points 234 and 242, circuit 90, resistor 232, switch 230, diode 228, to the positive (+) side of motor 214, which then runs in a direction such that meter 216 moves toward "Zero." Upon reaching "Zero" switch 230 moves to dotted position and current flow ceases.

In this overall circuit 212, at all times accumulative counter 192 is ready to indicate the reproduction undertaken that in this system preferable results in effective transcription by a secretary. Moreover, message meter 216, driven by motor 214 is at all times ready to indicate the recorded tape 40, i.e., dictation, that awaits reproduction and transcribing. Motor 214 operates in response to the net current flow regardless of its direction of flow. Therefore meter 216 is constantly indicating the true net position of tape awaiting reproduction. When both the secretary and the dictator are causing the advance of tape 40 equally, there is no change in the reading of meter 216.

Combining Listen-Relisten-Reset, Accumulated Transcription and Dictation Awaiting Transcription As shown in FIG. 9, the electrical circuits and apparatus of FIGS. 6, 7, and 8 may be combined and supplemented to improve the monitoring and control of a recording and reproducing system 20 as indicated in FIGS. 1 and 5, again employing unidirectional switches 54 which indicate when tape 40 is moving in a desired mode. Transistor 250 is necessary because in FIG. 8, Switch 230 opened when meter 216 reached "0," and in FIG. 9, switch 230 closes when "0" is reached. Closing switch 230 shorts the base of transistor 250 to ground, turning it off, and removing Resistor 232 and Diode 228 from the circuit.

Transistors 252 and 254 are necessary since switches 54D and 54T and 112 are now used for other functions. It becomes necessary to add transistors 252 and 254 to obtain the correct voltages for the proper operation of the circuit in FIG. 6. In order to turn on the latch circuit comprised of transistors 48 and 49, both transistors 252 and 254 must be turned on, providing a ground path through resistor 256. Transistor 252 turns on when switch arm 56D is in the dotted line position. This provides bias for transistor 254 which turns on when switch 112 is in the position shown in solid line, which then latches transistors 48 and 49 on by current through resistor 256. This provides the Listen reset function of FIG. 6.

We claim:

1. In a recording device, recording means for recording on a recording medium, control means for moving said recording medium in a first direction relative to said recording means so that said recording means records on said recording medium in a track parallel to an edge of said recording medium and for moving said recording medium in a second direction relative to said recording means, and adjusting means selectively responsive to said recording medium being moved in said second direction for returning a length of said recording medium to the position occupied prior to being moved in said second direction, said adjusting means including a solid state latching circuit having a first switch means operative in response to said control means becoming inoperative when said recording medium is not in said position and a second switch means operative in response to said first switch member becoming operative for moving said recording medium in said first direction.

2. In a recording device having a control means for moving a tape and a recording means in a first direction and in a second direction relative to each other in a path which is parallel to an edge of said tape and a switch means responsive to motion of said tape as said tape is being moved in said second direction for producing a switch condition, a solid state latching circuit which is responsive to said switch condition and to said control means becoming inoperative and which is arranged to cause said recording device to move said tape in said first direction until said tape is returned to the position at which said motion began, said solid state latching circuit causing said recording device to move said tape in said first direction by providing a common voltage at a plurality of terminal points, and said solid state latching circuit including a first switching means which is operative in response to a first voltage provided by said switch condition and a second voltage provided from one of said plurality of terminal points, and a second switching means which is operative in response to said first switching means becoming operative and which provides said common voltage to all of said plurality of terminal points and maintains said first switching means operative even though said second voltage is replaced by said common voltage at said one of said plurality of terminal points.

3. In a tape device in which a recording medium is moved relative to a recording means alternately in a first direction and in a second direction opposite said first direction and is moved relative to a transcribing means alternately in said first direction and in said second direction, first signal means for providing a first signal in response to motion of said recording medium relative to said recording means in said first direction when said motion is not to return said recording medium to a position occupied prior to motion in said second direction and for providing a second signal in the absence of said first signal, second signal means for providing a third signal in response to motion of said recording medium relative to said transcribing means in said first direction when said motion is not to return said recording medium to a position occupied prior to motion in said second direction and for providing a fourth signal in the absence of said third signal, and an indicating means for providing indicia which increase in magnitude in response to the simultaneous occurrence of said first signal and said fourth signal.

4. The tape device of claim 3 including adjusting means responsive to said second signal for causing motion of said recording medium in said first direction relative to said recording means.

5. The tape device of claim 4 in which said adjusting means is responsive to the simultaneous occurrence of said second signal and a first potential and including switch means for providing a second potential different from said first potential when said tape device becomes inoperative, and converting means for converting said second potential into said first potential.

6. The tape device of claim 3 in which said indicia decrease in magnitude in response to the simultaneous occurrence of said second signal and said third signal.

7. The tape device of claim 6 in which said indicia remain constant in magnitude in response to the simultaneous occurrence of said first signal and said third signal and in response to the simultaneous occurrence of said second signal and said fourth signal.

8. The tape device of claim 7 in which said indicating means provides a first electrical condition simultaneously with each of said indicia which is greater in magnitude than zero and which includes a status means for providing a second condition when all of said tape available for motion in said first direction had been moved in said first direction relative to said transcribing means, and a correcting means responsive to simultaneous occurrence of said first condition and said second condition for causing said indicating means to provide an indicium having the magnitude of zero.

9. In a tape device in which a recording medium is moved from a first tape bin to a second tape bin relative to a recording means and alternately in a first direction and in a second direction opposite to said first direction and in which said recording medium is subsequently moved from said second tape bin to said first tape bin relative to a transcribing means and alternately in said first direction and in said second direction, first signal means for providing a first signal in response to operation of a first switch positioned in said first tape bin by selective motion of said recording medium relative to said recording means in said first direction and for providing a second signal in the absence of said first signal, second signal means for providing a third signal in response to operation of a second switch positioned in said second tape bin by selective motion of said recording medium relative to said transcribing means in said first direction and for providing a fourth signal in the absence of said third signal, and indicating means for providing indicia in response to the simultaneous occurrence of two signals from a group of signals including said first signal, said second signal, said third signal and said fourth signal.

* * * * *